United States Patent [19]

Bernadic et al.

[11] Patent Number: 5,075,053
[45] Date of Patent: Dec. 24, 1991

[54] METHOD OF MAKING CUTTING INSERT

[75] Inventors: Thomas J. Bernadic, Madison Hts.; Charles E. Zimmerman, Southfield, both of Mich.

[73] Assignee: GTE Valenite Corporation, Troy, Mich.

[21] Appl. No.: 489,798

[22] Filed: Mar. 5, 1990

Related U.S. Application Data

[63] Continuation of Ser. No. 228,116, Aug. 4, 1988, abandoned.

[51] Int. Cl.$^5$ .............................................. B29C 43/02
[52] U.S. Cl. ....................................... 264/56; 264/109; 264/113; 264/125; 264/162; 264/225
[58] Field of Search ............... 264/125, 113, 126, 109, 264/225, 226, 227, 56, 162

[56] References Cited

U.S. PATENT DOCUMENTS

| | | | |
|---|---|---|---|
| 2,169,280 | 8/1939 | Pfanstiehl | 29/160.5 |
| 2,244,052 | 6/1941 | Comstock | 76/104 |
| 3,075,244 | 1/1963 | Glenn | 264/63 |
| 3,354,248 | 11/1967 | Haas et al. | 264/119 |
| 3,378,369 | 4/1968 | Smith | 75/206 |
| 3,386,821 | 6/1968 | Rice et al. | 75/226 |
| 3,406,555 | 10/1968 | Fuchs, Jr. | 72/377 |
| 3,702,881 | 11/1972 | Chaklader | 264/66 |
| 3,717,694 | 2/1973 | Mt. Pleasant, III | 264/67 |
| 3,823,002 | 7/1974 | Kirby, Jr. et al. | 29/182.1 |
| 3,842,646 | 10/1974 | Kuhn | 72/354 |
| 3,888,663 | 6/1975 | Reichman | 75/221 |
| 4,271,114 | 6/1981 | Ohno | 264/114 |
| 4,341,557 | 7/1982 | Lizenby | 75/223 |
| 4,431,449 | 2/1984 | Dillon | 75/246 |
| 4,541,977 | 9/1985 | Becker | 264/226 |
| 4,601,867 | 7/1986 | Martell | 264/226 |
| 4,682,643 | 7/1987 | Bernhardt | 264/226 |
| 4,726,927 | 2/1988 | Morgan et al. | 419/9 |
| 4,812,278 | 3/1989 | Natori | 264/226 |

OTHER PUBLICATIONS

Freeman; "Machinable Wax".
Freeman, "USEReport Update".
Thermoset Standard Tooling Systems: B.
Conap, Technical Data, Bulletins, ES-129, ES-130.
Tcc, Product Data, "Aluminum Filled Epoxy paste" TCC-410T.
Blehm Plastics, Product Data, BP9024, Jul. 1, 1987.
Blehm Plastics, Supplemental Data, BP-9024, Apr. 22, 1980.
Freeman, Tooling Plastics 800 Casting Resin Specs.

Primary Examiner—Jay H. Woo
Assistant Examiner—Jeromiah F. Durkin, II
Attorney, Agent, or Firm—Bill C. Panagos; Robert E. Walter

[57] ABSTRACT

A method for making a compact for a densified cutting insert, an easily machinable material is cut to the desired form, a plastic molding material having specific properties is contacted with the shaped machinable material, hardened to form a mold, and the resulting mold is used to form a compact for a cutting insert having the desired configuration which compact may be subsequently densified.

14 Claims, 1 Drawing Sheet

METHOD OF MAKING CUTTING INSERT

This is a continuation of copending application Ser. No. 07/228,116, filed on Aug. 4, 1988 now abandoned.

BACKGROUND OF THE INVENTION

The present invention is directed to cutting inserts of a hard refractory material and a method for their fabrication.

Cemented carbide and ceramic cutting inserts are typically prepared by pressing a powder mixture in a hard steel or carbide lined steel mold at pressures ranging from 5 to 30 tons per square inch depending on the size and shape of the compact. Sintering is then performed to form the final sintered cutting tool. Typically, the steel mold or die has a raised surface area on a face which forms a chip breaker in the final sintered insert. The powder mixture includes an organic binder which strengthens the compact for holding shape during sintering. According to one technique for forming a die used in making cemented carbide cutting inserts, a copper tungsten electrode having a flat face is shaped into the desired configuration. The shaped electrode is placed adjacent the flat face of a carbide punch and the electrode configuration is burned into the punch face. The punch face is then used to produce green compacted parts.

In forming a compact, the cavity used has an inside wall conforming to the side wall configuration of desired cutting insert. For instance, a round insert would be compacted in a cylinder. The cavity includes a bottom which may be a punch or stationary flat or shaped die. The grade powder or powder mix is poured into the cavity. The top punch has a bottom surface in an appropriate configuration. Generally, the upper portion of cavity tapers outwardly, for instance at a five degree angle, to minimize interference between the punch and the side walls of the cavity. The top punch is connected to a suitable pressing device for compacting the powder.

Heretofore, typical prior processes for making shaped cutting inserts have prepared the mold of steel or carbide by laborious time consuming methods.

SUMMARY OF THE INVENTION

The present invention uses starting powder or grains of a refractory or ceramic material which is densifiable to a hard dense refractory material. The starting powders are generally particularly abrasive, so that prior art molding techniques have concentrated on the use of steel or carbide-type molds.

According to the method of the present invention for making a compact for a sintered cutting insert, an easily machinable material is cut to the desired form, a plastic molding material having specific properties is contacted with the shaped machinable material, hardened to form a mold, and the resulting mold is used to form a compact for a cutting insert having the desired configuration which compact may be subsequently sintered.

In accordance with the present invention, as described in more detail, there is provided a method for making a densified cemented carbide cutting insert from a grade powder mixture comprising a refractory metal carbide and a metal binder, said densified cemented carbide having a predetermined desired shape including grooved recess adjacent a cutting edge adapted for breaking chips, said method comprising the following steps:

forming a machinable wax material into said predetermined desired shape including said desired grooved recess, said desired shape having a smooth surface and structural integrity at ambient temperatures, said forming comprising cutting said desired shape into said machinable wax material with a rotating cutting tool operably associated with a numerically controlled machine, contacting said shaped machinable material with an uncured flowable liquid plastic molding material whereby said molding material conforms to said desired shape, curing said plastic molding material to form a substantially incompressible solid plastic mold, said plastic molding material being a thermosetting or thermoplastic high polymer adapted to be molded and cured under ambient temperatures to a high dimensional accuracy wherein said cured plastic molding material is near theoretical density and is nonadhering and nonreacting with said grade powder, compacting a first batch of grade powder mixture into contact with said plastic mold at a sufficient pressure to form a compact having said predetermined desired shape removing said compact from said plastic mold, compacting additional batches of grade powder mixtures into contact with said mold for forming additional compacts, and sintering said additional compacts for producing production quantities of said densified compacts.

DRAWING DESCRIPTION

FIG. 1, the only figure, illustrates the mechanical device that can be used to press powders used in the present invention.

DETAILED DESCRIPTION

Figure 1:
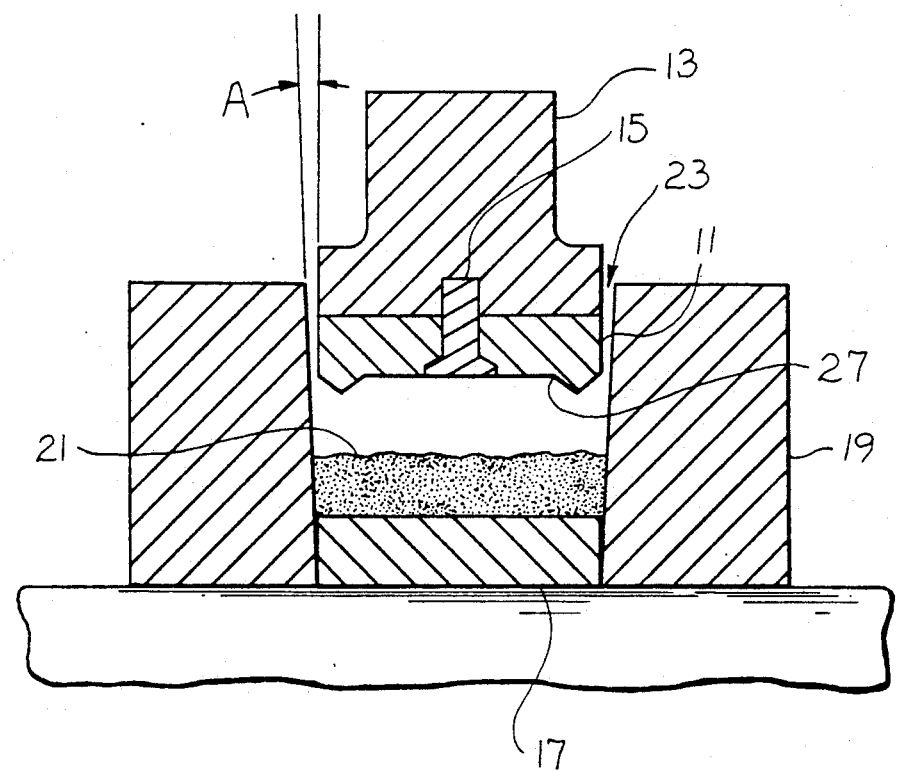

The present invention uses starting powders or grains of a refractory or ceramic material which are densifiable to a hard dense refractory material suitable for cutting tools. Typical ceramic powder mixtures include aluminum oxide and silicon nitride based powders which are sinterable into a densified cutting tool. Such ceramic powders typically contain densification aids for enhancing the ease of sintering and additional ingredients such as additional refractory materials for obtaining enhanced cutting tool properties such as increased toughness, enhanced hardness, or chemical resistance.

The preferred sintered materials of the present invention are cemented transition metal carbide substrates which comprise metal carbide particles in an amount from about 70 to about 97 percent by weight dispersed throughout a matrix of metal binder material which is present in an amount from about 3 to about 30 percent by weight. Typical transition metal carbides are carbides of tungsten, molybdenum, chromium, columbium, tantalum, titanium, zirconium, vanadium and hafnium. The cemented carbide cutting inserts of the present invention are preferably tungsten carbide based. Tungsten carbide is preferably employed in an amount greater than about 70 percent by weight. Due to its excellent wetability with binders, tungsten carbide is preferably used in its hexagonal form. Additional carbides having cubic type crystal structure are typically added or mixed with the tungsten carbide to impart improved crater resistance to the substrate. The most common additional carbides are those of titanium and tantalum with some specialized use made of the carbides of columbium, molybdenum, vanadium, chromium, zirconium and hafnium. Preferably less than about 15 percent by weight of the cemented carbide comprises such additional carbides.

The matrix metal binder material employed for the substrate is preferably the iron group metals comprising cobalt nickel and iron. Cobalt is the most preferred. Cobalt is preferred for use for tungsten carbide due to its excellent wetability. Other materials may be alloyed with the metal binder materials provided the desirable final properties are not effected. Small amounts of alloying agents may be added to the iron group metals. Typical alloying agents are molybdenum, tungsten, rhenium. The amount of alloying agent is preferably less than about 10 percent of the total weight of the matrix metal binder material.

The metal carbide and metal binder powders are typically mixed with a suitable organic binder to form a grade powder. The organic binder is selected to impart strength, typically referred to as green strength, to a cold compacted shape. Illustrative binders that are used include acetates, waxes and resins which are added to give the hereinbefore referred to green strength to a compact prior to sintering and promote the flowability of grade powder into die cavities to aid in pressing by a lubricating action. Paraffin type waxes which are insoluble in water as typically incorporated into grade powders by use of an organic solvent. The organic solvent or water used in forming the grade powder is typically removed by drying methods.

In processing the powders to a final densified shape, the desired shape is cut into an easily machinable material utilizing a rotating cutting tool controlled by a numerically controlled machine. The rotary cutting tool is held in a chuck assembly which is controlled by the machine to cut the desired configuration into the cutable material. Using this technique, it has be found that intricate shapes can be cut into the machinable wax with tools similar to a bur used by dentist. The shaping tools are preferably sharp drills which cut the wax material rather than abrade the wax material. It is contemplated that any shaping technique known in the art may be used. It has been found that a Digital Numeric Computer linked with a CAD/CAM system can be beneficially used to control the rotating tool to effect proper shaping.

The desired shape imparted to the machinable wax preferably includes the provision of chip breaker configuration adjacent a side wall. Chip breakers may include a variety of strategically located islands, bumps and angles in a variety of configurations which tend to radial deform and break the flowing chip. The typical cutting insert has a top face and a bottom face with peripheral side surfaces. The peripheral side surfaces may have a clearance angle with respect to the top face. The bottom face may be flat to provide support for the cutting insert when it is mounted on a cutting tool or may have a shape similar to the top face to provide additional indexability. The peripheral side surfaces merge to form cutting corners. For mounting purposes, the insert is desirably provided with a opening extending entirely through the insert from the top face to the bottom face. Typically, a pair of cutting edges extend away from respective corners and each cutting edge has associated therewith a grooved recess formed inwardly of the cutting edge to break chips being formed during cutting. Typically, the grooved recesses merge at the corners to form a chip breaker extending around the corners. The grooved recess comprises a descending surface extending downwardly from a cutting edge and an ascending surface extending upwardly from the descending surface or a bottom land in the grooved recess to a top face or central island. The cutting insert typically has a pair of parallel faces with a single side surface, as in the case of a circular insert, or a plurality of side surfaces joined to form the respective sides as is the case with a polygonal insert.

The easily machinable material is chemically inert to the plastic molding material so that further processing steps can be carried out so that subsequent deterioration of the die or mold is avoided. The easily machinable material is selected so that the final shape will desirably present a smooth surface to the molding material and maintain structural integrity at room or ambient temperatures. Typical materials for the easily machinable material include waxes which are low-melting temperature organic mixtures of compounds of high molecular weight having a smooth texture. Typical waxes include natural waxes such as beeswax, and various synthetic waxes such as ethylenic polymers and polyether-esters. The preferred machinable wax is obtained from Freedman Manufacturing and Supply Co., 1246 W. 70th Street, Cleveland, Ohio 44102. The wax has a flash point of 575 degrees F.

In accordance with the principles of the present invention, a plastic molding composition is next placed in contact with the shaped machinable material and cured to form a plastic mold. Preferably, the molding composite is in a liquid flowable state so that the material conforms to shape of the machinable material before curing occurs. The molding composition preferably possesses the properties of being moldable to near theoretical density without the presence of voids or bubbles, being formable into a smooth texture, and being nonadhering or nonreacting with the grade powder. Typical plastics used are thermosetting or thermoplastic high molecule weight polymers which can be molded or cured under ambient temperatures to a high dimensional accuracy. The plastic molding composition should have the desirable properties of sufficient hardness, sufficient compressive yield strength and sufficient abrasion resistance to permit compacting pressures of from 5 to 60 tons per square inch on an abrasive powder mixture without significant deterioration.

Preferred plastic molding compositions include polyurethane and epoxy resins. Typical molding compositions may be obtained from manufacturers such as Tool Chemical Co., Inc., (TCC), P.O. Box 20040, 2226 Burdette, Ferndale, Mich. 48220; BLEHM PLASTICS, INC. (BP), 608 East 10 Mile Road, Hazel Park, Mich. 48030; and Freeman Mfg. & Supply Co. Suitable molding compositions are often referred to as tooling plastics or casting resins by resin manufacturers. It is contemplated that preferred plastic molding compositions may incorporate fillers of a hard refractory material to enhance the hardness of the plastic. Typical fillers of refractory materials include alumina, mullite, metal carbides and nitrides, and metals such as tungsten and tantalum.

Preferred molding compositions preferably exhibit high compressive strength. When the preferred plastic molding compositions are tested according to an ASTM standard test on an Instron 1331 Load Frame at a ramp rate of 0.00033 I.P.S. (displacement vs. load), the preferred molding materials exhibit compressive strength having a deformation less than about 0.02 inch for 1000 pounds of pressure. Even more preferably, the preferred plastic molding compositions of the present invention exhibit a deformation which is less than about 0.02 inch for 1500 pounds of pressure. The compressive strength test is normally performed at ambient temperatures. However, even at 150 degrees fahrenheit the preferred plastic molding compositions exhibit deformation that is not significantly different that the deformation at the lower temperature.

The cured molding material in its final configuration is used as a blank or a die for pressing powders to form a green part. The completed mold may be mounted to a punch or used with a die to compress powder into the desired shape. The features, such as the grooved recesses, which appear as depressions in the machineable material, appear in relief as raised surfaces in the cured plastic mold. Typically the side walls of the plastic mold, which are located at the periphery of the raised surface, abut the inner walls of a mold cavity to form a die for forming a compact. The inner walls of the mold cavity conform to the outer peripheral side surfaces of the desired cutting insert and the face of the cured plastic molding composition conforms to the bottom surface in the mold cavity. It is also contemplated that the punch or pressure transmitting means may be formed of the cured plastic molding composition and include embossed or relief surfaces. In this situation, both the top and bottom surfaces of the pressed compact may have a desired relief to impart the desired shape to both the top and bottom surfaces of the compact for the cutting insert. It is also contemplated that the ceramic or carbide grade powder may be compressed between two punches or pressure transmitting means so as to apply an even compacting pressure against both the top and bottom surfaces of the compact. The die or punches for transmitting pressure to powder may be actuated by mechanical or hydraulic means known in the art. Typically pressures usually range from 5 to 60 tons per square inch depending on the size and shape of the compact.

The resulting green part is sintered at temperatures and pressures known in the art to form a densified cutting tool. Sintering is typically performed under conditions which result in near theoretical density and result in the metal binder forming a matrix between the grains of metal carbide particles. Typically sintering is performed under vacuum conditions and at temperatures from about 1350° to 1500° C. for times of about 30 to 150 minutes. Longer times can be utilized but are generally uneconomical.

EXAMPLES

A piece of machinable wax which is cut into a rectangular shape corresponding to the size of a desired cutting insert having opposed parallel side surfaces. The machinable wax utilized is the type formulated and manufactured by Freeman having a hardness of 50 through 55 shore "D" scale, a specific gravity of 92, a flashpoint of 575 degrees fahrenheit, a softening point of 226 degrees fahrenheit, a volumetric shrinkage at room temperature of 7 percent and having a blue color due to the presence of a blue pigment. The rectangular piece of machinable wax is clamped into place in proximity to a drill controlled by a CAD/CAM system. Computervision, Inc. sells both hardware and software for such a system which can be utilized with a Bostomatic 415 4-axis machining center to perform the desired cutting operations. A chip breaker configuration, designated 3-C, is machined into the face of the machinable wax piece. The resulting machinable wax piece has a image on the face of the machinable wax corresponding to the shape desired in a cutting insert. It has also been found that a very smooth finish may be obtained on the wax by polishing with a wax such as Johnson's Wax TM. Next, the machined piece is placed in a SNG-54 cemented carbide die cavity having vertical sidewalls which are spaced to correspond to the sidewalls of the final insert. A preheated epoxy resin from Tool Chemical Company, Inc., Resin 401 TCC, is poured into the die cavity and over the machinable wax piece. The mixture is permitted to cure in a air oven at 60 degrees centigrade for three hours. The molding composition comprised 10 parts of resin per one part of hardener by weight. Since uncured polyurethane resins and hardeners absorb moisture from the air or any surface to which they are exposed, the container is kept tightly closed when not in use and the material is cast in dry, nonporous die cavity. Moisture present on the mold surface may react to create bubbles. Vacuum air removal is also desirable. The resulting mold which is removed from the machinable wax piece has a negative image on the face of the epoxy resin mold.

With reference to FIG. 1, the mold or plastic die 11 is securely mounted to the underside of a punch 13. As illustrated in the drawing, this attachment is effected with a threaded screw 15. A flat piece of cemented carbide 17 is placed at the bottom of the SNG-54 cemented carbide die cavity 19 previously referred to. About 22.5 grams of cemented carbide grade powder 21, Valenite grade VC-830 powder, is placed in the die cavity 19 on top of the flat piece of carbide 17. Both the flat carbide piece 17 and the punch 13 with the plastic mold 11 fit closely into the opening 23 in the die cavity 19. As illustrated in the drawing, the walls of the die cavity 19 taper outwardly at a slight angle A which is about 5 degrees to accommodate the punch 13 and plastic die 11. Note that relief 27 is shown on the plastic die 11. The punch 13 with the plastic mold 11 are mounted to a manual arbor press so that the punch 13 can be moved toward the flat carbide piece 17 to compress the powder 21. The press is actuated so that the cemented carbide grade powder 21 is subject to a prepressing step at a pressure of about 8,000 pounds. Next, the die cavity 19 including grade powder 21, carbide piece 17 and plastic mold 11 is mounted on a hydraulic press and pressed to a pressure of about 15,000 pounds by increasing the pressure at a steady rate against the flat carbide piece 17. Next, the pressed cemented carbide body is removed from the mold. The resulting compact has sufficient strength so that a center opening may be drilled into the body. The resulting piece is then sintered in a furnace under a vacuum at temperature of about 1400° C. for about 70 minutes.

Following the above procedure, additional inserts were made by using molding compositions entitled, BP-9024, from BLEHM PLASTICS, INC. Another insert was made using the BP-2019 plastic but, additionally, including 30 percent by weight aluminum oxide ceramic powder. The ceramic powder was found to enhance the compressive strength of the mold.

The particular embodiments of the present invention being described, it is obvious to one of ordinary skill in the art to make various modifications and changes and proportions, temperatures, pressures and operative steps without departing from the spirit and scope of the present invention.

What is claimed is:

1. A method for making a densified cutting insert of a hard refractory material of the type having a predetermined desired shape including a recess adjacent a cutting edge adapted for breaking chips during machining of a workpiece, comprising forming a machinable wax material into a predetermined desired shape including a surface having said recess, contacting said machinable wax material having said predetermined desired shape with an uncured flowable liquid moldable plastic material and curing said moldable plastic material to form a substantially incompressible solid plastic mold having a raised portion corresponding to said recess, separating said incompressible solid plastic mold from said machinable wax material, compacting a powdered mixture comprising an organic binder and hard refractory particles into contact with said incompressible plastic mold at a sufficient pressure to form a compact having said predetermined desired shape including said recess, removing said compact from said incompressible plastic mold, compacting additional powder mixtures into contact with said incompressible plastic mold, and sintering said compacts for producing densified cutting inserts having the predetermined desired shape.

2. A method for making a compact for a densified cutting insert of a hard refractory material having a predetermined shape according to claim 1 wherein said moldable plastic has the compressive yield strength and abrasion resistance to permit compacting pressures from 5 to about 60 tons per square inch.

3. A method for making a compact for a densified cutting insert of a hard refractory material having a predetermined desired shape according to claim 1 wherein said powdered mixture comprised of a refractory metal carbide and a metal binder.

4. A method for making a compact for a densified cutting insert of a hard refractory material having a predetermined desired shape according to claim 1 wherein said insert has a peripherical cutting edge and a grooved recess adjacent said cutting edge adapted for breaking chips.

5. A method for making a compact for a densified cutting insert of a hard refractory material having a predetermined desired shape according to claim 1 wherein said machinable wax material has a smooth surface and structural integrity at ambient temperatures.

6. A method for making a compact for a densified cutting insert of a hard refractory material having a predetermined desired shape according to claim 1 wherein said machinable wax material is a low-melting temperature organic mixture of high molecular weight compounds having a smooth texture and comprising natural waxes.

7. A method for making a compact for a densified cutting insert of a hard refractory material having a predetermined desired shape according to claim 1 wherein said machinable wax material is selected from the group consisting of beeswax, ethylenic polymers, and polyether-esters.

8. A method for making a compact for a densified cutting insert of a hard refractory material having a predetermined desired shape according to claim 1 wherein said forming comprising cutting said desired shape with rotating cutting tool operably associated with a numerically controlled machine;

9. A method for making a compact for a densified cutting insert of a hard refractory material having a predetermined shape according to claim 1, wherein said plastic molding material is capable of being molded to about theoretical density without the presence of voids.

10. A method for making a compact for a densified cutting insert of a hard refractory material having a predetermined shape according to claim 1, wherein said plastic molding material is formable into a smooth surface and is non-adhering and non-reacting with said powder mixture.

11. A method for making a compact for a densified cutting insert of a hard refractory material having a predetermined desired shape according to claim 1 wherein said plastic moldable material is a thermosetting or thermoplastic high molecular weight polymer adapted to be molded or cured under ambient temperatures to a high dimensional accuracy.

12. A method for making a compact of a densified cutting insert of a hard refractory material having a predetermined shape according to claim 1, wherein said plastic material has sufficient hardness, sufficient impressive yield strength and sufficient abrasion resistance to permit compacting pressures of from 5 to 60 tons per square inch on said powdered mixture without significant deterioration.

13. A method for making a densified cemented carbide cutting insert from a grade powder mixture comprising a refractory metal carbide and a metal binder, said densified cemented carbide having a predetermined desired shape including grooved recess adjacent a cutting edge adapted for breaking chips, said method comprising the following steps:

forming a machinable wax material into said predetermined desired shape including said desired grooved recess, said desired shape having a smooth surface and structural integrity at ambient temperatures, said forming comprising cutting said desired shape into said machinable wax material with a rotating cutting tool operably associated with a numerically controlled machine, contacting said shaped machinable wax material with plastic molding material whereby said molding material conforms to said desired shape, curing said plastic molding material to form a substantially incompressible solid plastic mold, said plastic molding material being a thermosetting or thermoplastic high polymer adapted to be molded or cured under ambient temperatures to a high dimensional accuracy wherein said cured plastic molding material is near theoretical density, nonadhering and nonreacting with said powder mixture, compacting a first batch of grade powder mixture into contact with said plastic mold at a sufficient pressure to form a compact having said predetermined desired shape removing said compact from said plastic mold.

compacting additional batches of grade powder mixtures into contact with said mold for forming additional compacts, 14. A method for making a densified cemented carbide cutting insert from a grade powder mixture comprising a refractory metal carbide and a metal binder, said densified cemented carbide having a predetermined desired grooved recess adjacent a cutting edge adapted for breaking chips, said method comprising the following steps:

forming a machinable wax material into said predetermined desired shape, said desired shape including a desired grooved recess and having a smooth surface and structural integrity at ambient temperatures, said wax material being a low-melting organic mixtures of high molecular weight compounds having a smooth texture and comprising natural waxes selected from the group consisting of beeswax, ethylenic polymers, and polyether-esters, said forming comprising cutting said desired shape with rotating cutting tool operably associated with a numerically controlled machine, contacting said shaped machinable material with an uncured flowable liquid plastic molding material whereby said molding material conforms to said desired shape, curing said plastic molding material to form a substantially incompressible solid plastic mold, said molding material having desirable favorable properties of being molding to near theoretical density without the presence of voids, and being nonadhering and nonreacting with said grade powder, said plastic molding material being a thermosetting or thermoplastic high polymer adapted to be molded or cured under ambient temperatures to a high dimensional accuracy, said plastic material having sufficient hardness, sufficient compressive yield strength and sufficient abrasion resistance to permit compacting pressures from 5 to 60 tons per square inch on for said grade powder without significant deterioration, said plastic material selected from the group consisting essentially of polyurethane and epoxy resins, and incorporating fillers of a hard refractory material to enhance the hardness of the plastic, said fillers of refractory materials selected from the group consisting of alumina, metal carbides and nitrides and oxides, borides and mixtures thereof, compacting a first batch of grade powder mixture comprising an organic binder and hard refractory particles into contact with said mold at a sufficient pressure to form a compact having said desired shape removing said compact from said substantially incompressible mold.

* * * * *